United States Patent [19]
Hunter

[11] 3,906,346
[45] Sept. 16, 1975

[54] PRECISION TIME INTERVAL COMPARATOR

[75] Inventor: John M. Hunter, Cupertino, Calif.

[73] Assignee: The United States of America as represented by the Secretary of the Navy, Washington, D.C.

[22] Filed: Dec. 26, 1972

[21] Appl. No.: 321,483

[52] U.S. Cl. ............... 324/186; 324/188; 235/92 T; 235/92 CA
[51] Int. Cl.² ......................................... G04F 10/00
[58] Field of Search ........... 324/186, 187, 181, 188; 343/5 DP; 328/129

[56] References Cited
UNITED STATES PATENTS

| | | | |
|---|---|---|---|
| 3,349,400 | 10/1967 | Asher et al. | 343/5 DP |
| 3,349,401 | 10/1967 | Kennedy et al. | 343/5 DP |
| 3,380,020 | 4/1968 | Clark | 324/186 |
| 3,537,003 | 10/1970 | Planta et al. | 324/186 |
| 3,660,845 | 5/1972 | Pettersson | 343/5 DP |
| 3,735,263 | 5/1973 | Boatwright | 324/186 |

Primary Examiner—Maynard R. Wilbur
Assistant Examiner—G. E. Montone
Attorney, Agent, or Firm—R. S. Sciascia; Charles D. B. Curry

[57] ABSTRACT

A precision time interval comparator device including an automatic time interval acquisition and continuous acceptance limit control means. The device combines digital and analog circuitry and a means to precisely and automatically measure and store the time interval between two events while comparing succeeding events against the stored time interval by means of an acceptance window which will periodically open at multiples of the stored time interval.

8 Claims, 3 Drawing Figures

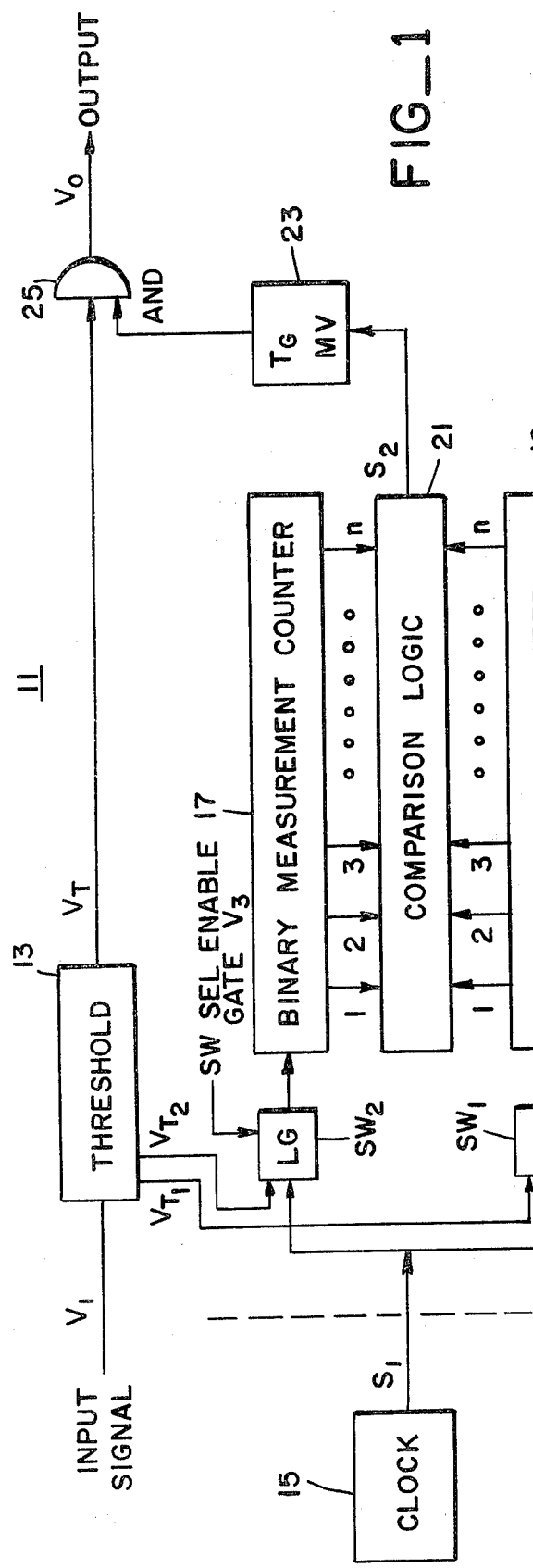
FIG_1
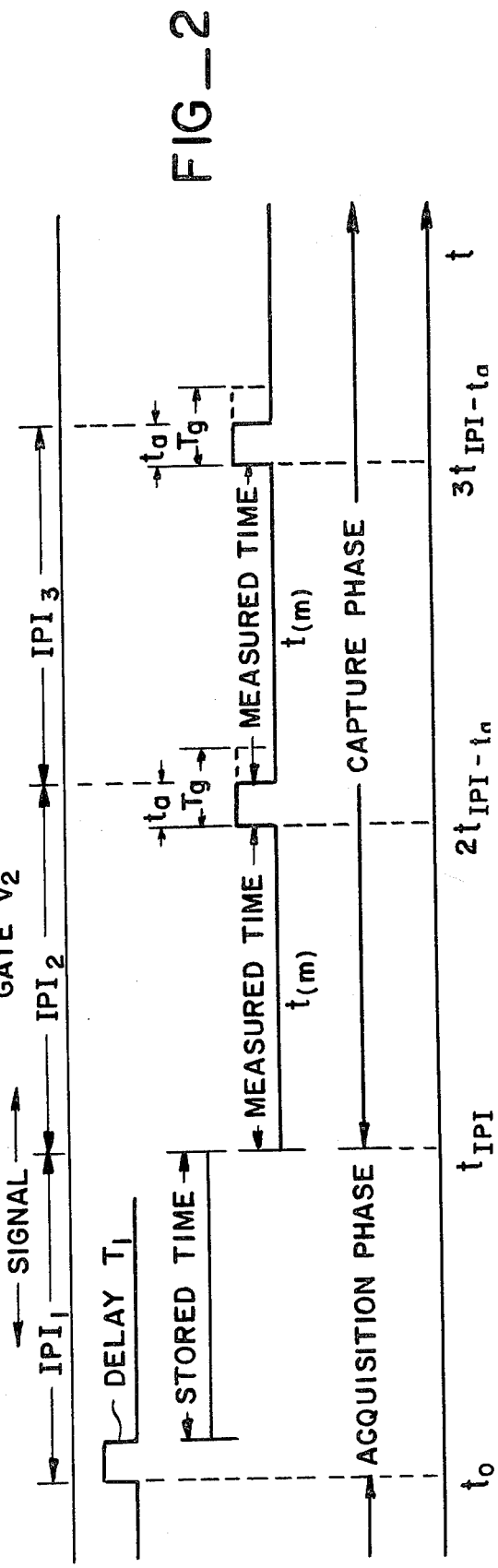
FIG_2

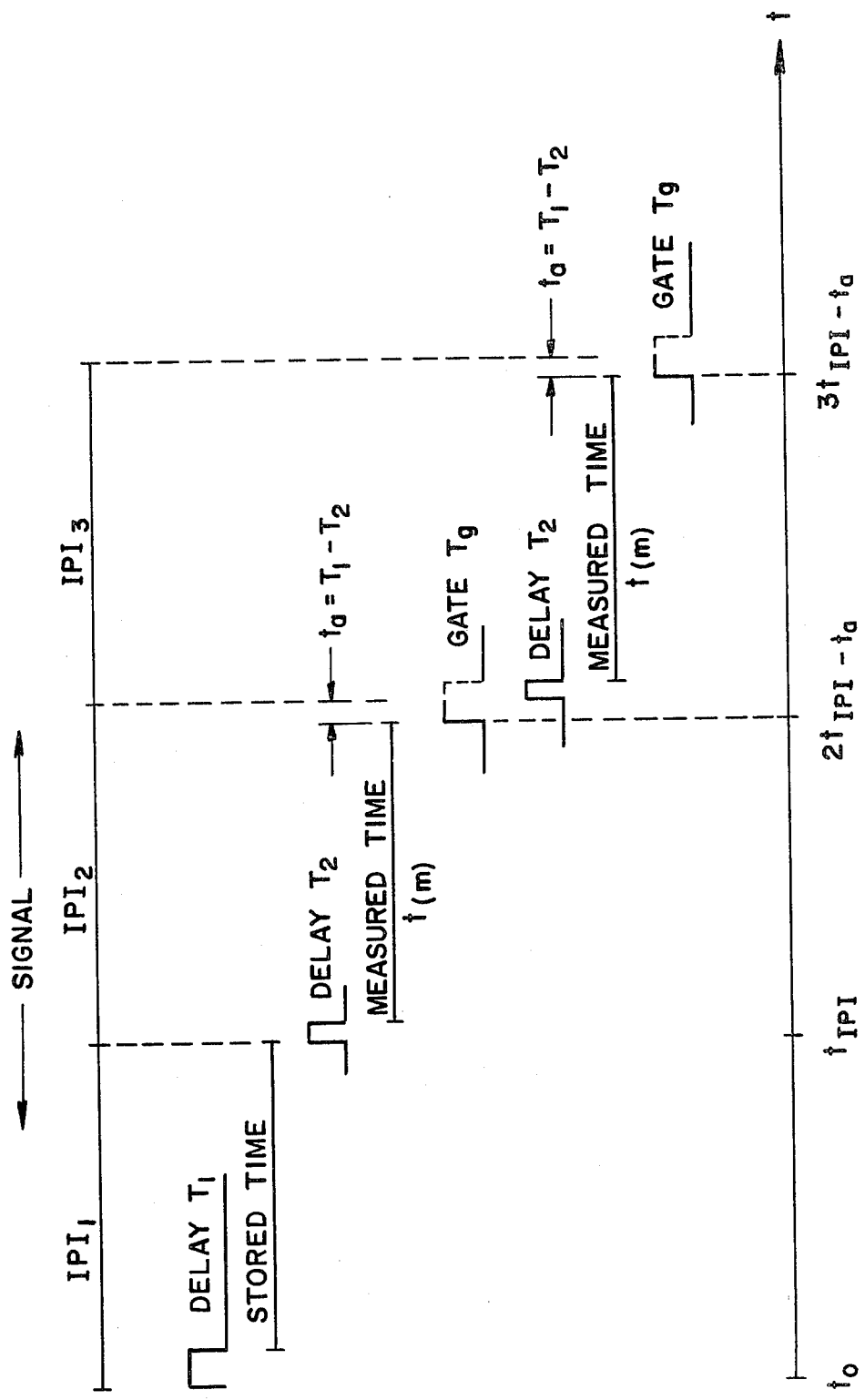
FIG—3

1

PRECISION TIME INTERVAL COMPARATOR

BACKGROUND OF THE INVENTION

1. Field of the Invention.

The device which is the subject matter of the present invention relates generally to a time interval comparator and more particularly to a precision time interval comparator with an automatic time interval and continuous acceptance limit control means to precisely measure and store the time interval between two events and as well as comparing succeeding events against the stored time interval.

2. Description of the Prior Art.

The unique system is basic and has intensive and valuable application to radar pulse train tracking systems as well as to pulse signal acquisition or sorting systems. The devices can effectively translate the acceptance window in time as well as narrow the acceptance limits.

SUMMARY OF THE INVENTION

Briefly, the present invention is a precision time interval comparator device including an automatic time interval acquisition and continuous acceptance limit control means. The device combines digital and analog circuitry and a means to precisely and automatically measure and store the time interval between two events while comparing succeeding events against the stored time interval by means of an acceptance window which will periodically open at multiples of the stored time interval. The system can keep a clock rate constants thereby allowing one precision clock to service many channels. The device would be a valuable limiting device for signal tracking systems or the like.

STATEMENTS OF THE OBJECTS OF THE INVENTION

A primary object of the present invention is to provide a device which measures and stores the time interval between two events while comparing succeeding events against the stored time interval.

Another object of the present invention is to provide a device for effectively translating an acceptance window in time while narrowing its acceptance limits.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a block diagram of the time interval comparator circuitry;

FIG. 2 is the timing diagram illustrating the acquisition phase and capture phase for the comparator circuitry described in FIG. 1; and FIG. 3 is the timing diagram with $T_2$ added to allow the anticipation time of $T_g$ to be altered for the comparator circuitry described in FIG. 1.

DESCRIPTION OF THE PREFERRED EMBODIMENT

Referring now to the drawings and particularly to FIG. 1, the precision time interval comparator 11 generally includes the following:
a threshold circuit 13, a clock 15, logic gates time delay switches $SW_1$ and $SW_2$, a binary measurement counter 17, a binary storage counter 19, comparison logic circuit 21, multivibrator circuit 23, and AND gate 25. The comparator 11 combines digital and analog circuits, such as binary counters 17 and 19 and voltage controlled one-shot multivibrators 23, or the like, to precisely and automatically measure and store the time interval between two events and to compare succeeding events against the stored time interval by means of an acceptance window which periodically opens at multiples of the stored time interval. Each counter 17 and 19, sixteen stages in length, is comprised of four dual inline, each containing four flip-flop circuits. Switches $SW_1$ and $SW_2$ are standard time delay switches which are connected to the output of clock 15. For purposes of explanation of the gist of the invention, the logic gates will be referred to as switches $SW_1$ and $SW_2$. It should be noted that any equivalent sequential switching system may be used to operate comparator 11 and is therefore deemed not to be critical to the inventive concept but only a constructive means used in the art for activating the circuit combination. However, the circuit combination and its inherent function is to be considered the nexus of the invention. Clock 15 can be a standard clock oscillator. The comparison logic circuit 21 consists of four (Fairchild) micro matric comparator arrays, for example, each array providing four binary comparisons between counters 17 and 19. Comparison logic circuit 21 is used to compare succeeding events against the stored time interval. Switches $SW_1$ and $SW_2$ are standard time delay switches supplied with suitable energization and operating sequentially with respect to each other.

The operation of comparator 11 may be better understood by reference to FIGS. 1, 2 and 3 where the function of the timing circuit of FIG. 1 with its two sets of counters 17 and 19, each of n stages in length, is specifically described in relation to the timing diagram of FIG. 2. To acquire a signal, a stored command signal $S_1$ is addressed to switch $SW_1$ from clock 15 at the time of a signal threshold crossing. However, $SW_1$ is delayed in closing for a prescribed time delay $T_1$. When the next pulse crosses, the threshold switch $SW_1$ is opened and switch $SW_2$ is closed. The count stored in the storage counter or n-bit binary ripple counter 19 will be less than the interpulse interval $IPI_1$ signal, hereinafter referred to as $IPI_{sig}$, by a number of counts equal to time delay $T_1$ times the clock rate of clock 15. Thus, when the measurement counter 17 acquires a matching count, the time will be about $T_1$ microseconds in anticipation of the next signal pulse. The equality of the two counters is detected by the comparison logic circuit 21 which generates a resulting output signal $S_2$ to activate an acceptance AND gate 25 which is a voltagecontrollable one-shot multivibrator for time delay $T_G$ (in microseconds) sc that time delay $T_G$ is greater than $T_1$. The logic gates $SW_1$ and $SW_2$ may be comprised of AND gates with flip flops and one-shot oscillators which are standard circuits which are well known for their use as sequential switching devices, and therefore, a very limited discussion of this circuitry is deemed necessary for the understanding of the invention. Switch select enable signals gate signals 2 and $V_3$ can be used for proper sequencing of $SW_1$ and $SW_2$ while the logic gates can generate the proper time delay signals, that is, time delay signals $T_1$, $T_2$ and $T_g$. The enable gate signals can be acquired from any number of well known functional devices such as TTL logic gates, or the like, which operate in a conventional manner.

The clock 15 can be any well known clock oscillator or its equivalent. This timing sequence is accomplished in the following manner: Input signal $V_1$ is applied to a standard threshold circuit 13. The threshold circuit 13 generates threshold output signals $V_T$, $V_{T_1}$ and $V_{T_2}$ at each threshold crossing. $V_T$ signal is applied to the input of gate 25 while threshold signals $V_{T_1}$ and $V_{T_2}$ are applied to each of switches $SW_1$ and $SW_2$, respectively. When enable gate signal $V_2$ is applied to $SW_1$, the store command signal $S_1$ is adressed to switch $SW_1$. $SW_1$ and $SW_2$ simultaneously receive threshold signals $V_{T_1}$ and $V_{T_2}$, respectively, while $S_1$ is addressed to switch $SW_1$. However, the threshold signals are not sensed until $SW_1$ and $SW_2$ are activated. $SW_1$ is delayed in closing for a prescribed time delay $T_1$. This cycle may be described as the acquisition phase. Enable gate signal $V_2$ is then cut off and enable gate signal $V_3$ is next applied to $SW_2$ at the time of the next signal pulse crossing, thereby opening switch $SW_1$ and closing switch $SW_2$. When the signal pulse occurs during time delay $T_G$, the binary measurement counter 17 is cleared and switch $SW_2$ is allowed to remain closed, permitting the counter to accumulate for the next cycle. In this manner the rate signal is acquired, the IPI stored and the acceptance window is generated. A discussion of the means for updating IPI stores and collapsing the acceptance gate width follows.

The timing diagrams of FIGS. 2 and 3 are constructed so that the time interval between certain events is a function of time. Where $t_o$ is the initial threshold signal crossing time, $t_{IPI}$ is interpulse interval times and $t_a$ is the anticipation time, hereinafter referred to as $t_o$, $t_{IPI}$ and $t_a$. Time $t_o$ to $t_{IPI}$ represents the signal acquisition phase and $t_{IPI}$ to $3t_{IPI}$ represents the capture phase of operation of comparator 11. $IPI_1$, $IPI_2$, and $IPI_3$ represent the stages of the interpulse interval signals and their relationship with $T_1$, $T_2$, $T_g$, $T_m$, and $T_a$.

The AND gate 25, as known in the art, requires the presence of all of a number of input conditions to produce an output, in the instant case signals $V_T$ and $T_G$. The two inputs at gate 25 are gate width signal $T_G$, which is the output signal from multivibrator 23, and threshold signal $V_T$, which is one of the output signals from a conventional threshold circuit 13. The threshold output signal $V_T$ results from input signal $V_1$. The AND gate 25 has an output signal $V_o$ which is an electrical representation of the time interval between two events as well as a comparison of succeeding events against a stored time interval.

Referring to FIG. 2, to effectively collapse the acceptance gate it is necessary to narrow the gate width time delay $T_G$ and to minimize the anticipation time. This can be done easily because time delay $T_G$ is obtained from a one-shot multivibrator, such as multivibrator 23, which can be voltage controlled if desired. This last condition is analogous to improving the estimate of the measured $IPI_{sig}$.

If the anticipation time is defined as $t_a$ and if the signal's interpulse interval is IPI signal, the anticipation time for the above technique is $t_a = IPI_{sig} - $ IPI stored
$t_a = IPI_{sig} - $ (IPI signal $- T_1$)
$t_a = T_1$ which is constant and preset.

Now consider the effect of introducing a control time delay $T_2$ for $SW_2$. When a cycle begins, formerly with clearing the measurement counter and the closure of $SW_2$, the counter does not begin to acquire a count until time delay $T_2$ microseconds have been reached, a period controlled by the one-shot multivibrator. The time ($t_m$) for the measurement-counter store to equal the storagecounter store is now $t_m = IPI_{sig}$ stored $+ T_2$
$t_m = (IPI_{sig} - T_1) T_2$
$t_m = IPI_{sig} + (T_2 - T_1)$ and the anticipation time is $t_a = IPI_{sig} - t_m$
$t_a = T_1 = T_2$ and $t_a \rightarrow O$ as $T_2 \rightarrow T_1$ Thus by the simple introduction of a voltage-controlled one-shot delay time $T_2$ and a voltage-controllable one-shot window of time delay $T_G$, a unique mechanism for effectively improving the fit of the stored IPI and collapsing the acceptance window about the signal to the limitation of about plus or minus a half clock cycle of clock 15 is obtained. Because the duration of either time delay $T_2$ or $T_G$ will probably be limited to a few microseconds, the instabilities of the analog circuitry, voltage-controlled one-shots will be at most fractions of a microsecond and directly comparable to a clock cycle. The novelty of the technique lies in the fact that the clock rate is not changed, allowing one precision clock, such as clock 15, to service many channels, and that the arithmetical problems associated with binary-stored differencing, incrementing and decrementing, have been reduced to a single point of equality comparison for which the simplest of digital counters, the binary-ripple counter, is used.

The prime limitation on the register length, for a given clock rate or time resolution, is the propagation time of the ripple counters in counters 17 and 19. For reliable operation, the total propagation or ripple time should be less than about one-half of a clock period on clock 15. That is, $n(tp) \leq 0.5 T_c$ or 1. 
$n \leq (Tc/2tp)$ where
$T_c = $ the period of one clock cycle,
p = propagation time for an individual stage,
and $n = $ number of stages in the counter.

The $IPI_{sig}$ range is determined by clock rate and register length.

as

2. 
$IPI_{sig}$ max $= T [2^n - 1]$

For the maximum value of $n$ in Eq. (1)

3. 
$IPI_{sig}$ max $= T_c [2^{T_c/2tp} - 1]$

Consideration of equation (3) shows that small changes in clock period (or time resolution) produces large changes in $IPI_{sig}$ max (or $IPI_{sig}$ range to be covered). As an example, Table 1 illustrates values compiled for a realistic value of tp equal to 30 nsec.

TABLE

| Resolution ($T_c$) | n ($T_c/2tp$) | Count Capacity ($2^n - 1$) | IPI max ($\mu$ sec) |
|---|---|---|---|
| 1 sec | ~ 16 | 65535 | 65535 |
| 0.5 $\mu$ sec | ~ 8 | 255 | 127.5 | so that from 1 nsec. to 0.5 nsec. the count capacity increases from 255 to 65535 while $IPI_{sig}$ max increases from 127.5 nsec. to 65535 nsec.

Various modifications and other applications of the invention are contemplated and may already be resorted to by those skilled in the art without departing from the spirit and scope of the invention, as hereinafter defined by the appended claims, as only a preferred embodiment thereof has been disclosed. For example, a general application of this device is suggested for time or delay lock loop systems which commonly require a fixed delay and a variable oscillator or clock. This device offers the possibility of using fixed clock or oscillator rates and making the delay element variable. Specific examples of application include radar pulse train tracking systems and pulse signal acquisition or sorting systems.

What is claimed is:

1. A time interval comparator to measure and store the time interval between two events while comparing succeeding events against the stored time interval comprising:
    a. a binary storage counter for storing the time interval count between two events;
    b. a binary measurement counter for measuring the time interval count between two events;
    c. a means for initiating a series of pulsed threshold signals;
    d. a means for generating a time delay signal pulse simultaneously with the initiation of the initial threshold signal from said threshold means to store the time delay interval count in said storage counter until the next series threshold signal said time delay generating means initiating said measurement counter at the next series threshold signal until said measurement acquires matching time delay interval count of said storage counter;
    e. a means for comparing the equality of the counts between said binary storage counter and said binary measurement counter; and
    f. said comparing means generating an output signal to the input of an acceptance gate having a threshold input signal wherein the output signal activates said gate.

2. The device recited in claim 1 wherein said means for generating a time delay signal comprises:
    a. a clock to generate a time signal;
    b. a first time delay switch connected between said clock and said binary storage counter to activate said storage counter after a prescribed time delay at the initial signal threshold crossing; and
    c. a second time delay switch connected between said clock and said binary measurement counter to activate said measured counter at a second signal threshold crossing and terminating when said measurement counter acquires a matching count equivalent to said storage counter.

3. The device recited in claim 2 wherein said binary storage counter comprises four dual inline packages, each of said packages containing four flip flop circuits.

4. The device recited in claim 2 wherein said binary measurement counter comprises four inline packages, each containing four flip flop circuits.

5. The device recited in claim 1 wherein said comparison means is comprised of four matrix comparator arrays, each array having four binary comparisons between said binary measurement counter and said binary storage counter.

6. The device recited in claim 1 wherein said comparator further includes a means for collapsing said AND gate.

7. The device recited in claim 6 wherein said collapsing means is a one-shot oscillator.

8. The device recited in claim 1 wherein said acceptance gate is an AND gate.

* * * * *